(12) United States Patent
Wood et al.

(10) Patent No.: US 8,583,907 B2
(45) Date of Patent: *Nov. 12, 2013

(54) ELECTRONIC DEVICE HAVING AN ALTERABLE CONFIGURATION AND METHODS OF MANUFACTURING AND CONFIGURING THE SAME

(71) Applicant: Research in Motion Limited, Waterloo (CA)

(72) Inventors: Robert Henderson Wood, Waterloo (CA); Bao Quoc Nguyen, Waterloo (CA)

(73) Assignee: Blackberry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/719,725

(22) Filed: Dec. 19, 2012

(65) Prior Publication Data

US 2013/0111201 A1    May 2, 2013

Related U.S. Application Data

(63) Continuation of application No. 13/413,974, filed on Mar. 7, 2012, now Pat. No. 8,364,942, which is a continuation of application No. 12/392,348, filed on Feb. 25, 2009, now Pat. No. 8,156,316, which is a continuation of application No. 11/082,706, filed on Mar. 18, 2005, now Pat. No. 7,516,315.

(51) Int. Cl.
*G06F 9/24*    (2006.01)
*G06F 15/177*    (2006.01)
*G06F 9/00*    (2006.01)
*G06F 9/445*    (2006.01)

(52) U.S. Cl.
USPC ............... 713/1; 713/2; 713/100; 717/174; 717/176; 717/177; 717/178

(58) Field of Classification Search
None
See application file for complete search history.

(56) References Cited

U.S. PATENT DOCUMENTS

| | | |
|---|---|---|
| 5,381,549 A | 1/1995 | Tamura |
| 5,729,683 A | 3/1998 | Le et al. |
| 5,859,911 A | 1/1999 | Angelo et al. |
| 5,987,605 A | 11/1999 | Hill et al. |
| 6,175,917 B1 | 1/2001 | Arrow et al. |
| 6,178,503 B1 * | 1/2001 | Madden et al. .......... 713/2 |
| 6,205,513 B1 | 3/2001 | Godicke et al. |
| 6,393,560 B1 * | 5/2002 | Merrill et al. .......... 713/2 |
| 6,393,585 B1 | 5/2002 | Houha et al. |
| 6,418,541 B1 | 7/2002 | Jeon |
| 6,442,067 B1 | 8/2002 | Chawla et al. |
| 6,532,538 B1 * | 3/2003 | Cronk et al. .......... 713/2 |
| 6,557,169 B1 | 4/2003 | Erpeldinger |

(Continued)

FOREIGN PATENT DOCUMENTS

EP    1 100 014 A    5/2001

*Primary Examiner* — Ji H Bae

(57) ABSTRACT

An electronic device having an alterable configuration includes a non-volatile memory configurable to include at least a first partition and a second partition, the non-volatile memory storing a boot ROM. The boot ROM is operable when executed by a processor of said electronic device to, in the event that a third partition is available, boot an operating system in the third partition, the operating system operable when booted to cause the third partition to be deleted and the second partition to be expanded to encompass memory freed by the deletion; and otherwise boot an operating system in the first partition.

20 Claims, 7 Drawing Sheets

(56) References Cited

U.S. PATENT DOCUMENTS

| | | |
|---|---|---|
| 6,594,723 B1 | 7/2003 | Chapman et al. |
| 6,763,458 B1 * | 7/2004 | Watanabe et al. ............. 713/100 |
| 6,934,881 B2 | 8/2005 | Gold et al. |
| 6,948,099 B1 | 9/2005 | Tallam |
| 7,000,231 B1 * | 2/2006 | Gold ............................. 717/174 |
| 7,263,589 B2 | 8/2007 | Han et al. |
| 7,509,530 B2 * | 3/2009 | Welts .............................. 714/15 |
| 7,516,315 B2 | 4/2009 | Wood et al. |
| 8,156,316 B2 | 4/2012 | Wood et al. |
| 8,364,942 B2 | 1/2013 | Wood et al. |
| 2002/0103996 A1 | 8/2002 | LeVasseur et al. |
| 2002/0143844 A1 | 10/2002 | Tsai |
| 2002/0157001 A1 | 10/2002 | Huang et al. |
| 2004/0054883 A1 | 3/2004 | Goodman et al. |
| 2004/0059905 A1 * | 3/2004 | Soulier ............................. 713/2 |
| 2004/0117414 A1 | 6/2004 | Braun et al. |
| 2004/0192373 A1 | 9/2004 | Galetti |
| 2005/0055595 A1 | 3/2005 | Frazer et al. |
| 2006/0112213 A1 * | 5/2006 | Suzuoki et al. ............... 711/100 |
| 2008/0222207 A1 * | 9/2008 | Ito ................................. 707/200 |
| 2009/0138865 A1 * | 5/2009 | Furbee et al. ................. 717/168 |

* cited by examiner

United States Patent US 8,583,907 B2

ELECTRONIC DEVICE HAVING AN ALTERABLE CONFIGURATION AND METHODS OF MANUFACTURING AND CONFIGURING THE SAME

REFERENCE TO RELATED APPLICATION

This application is a continuation application of U.S. patent application Ser. No. 13/413,974, filed on Mar. 7, 2012, which is a continuation application of U.S. patent application Ser. No. 12/392,348, filed Feb. 25, 2009, and now granted as U.S. Pat. No. 8,156,316, which is a continuation application of U.S. patent application Ser. No. 11/082,706, filed on Mar. 18, 2005, and now granted as U.S. Pat. No. 7,516,315, all of which are hereby incorporated by reference in their entirety.

FIELD OF THE INVENTION

The invention relates generally to electronic devices and, more specifically, to an electronic device having an alterable configuration and methods of manufacturing and configuring the same.

BACKGROUND OF THE INVENTION

The use of operating systems customized for the purpose of electronic device calibration is known. During manufacture, special calibration firmware including a factory operating system ("OS") is programmed or loaded onto a flash memory chip, which is then soldered onto a main circuit board incorporated into an electronic device. The factory OS is customized to facilitate calibration and customization of the device.

Once the calibration and customization of the electronic device is completed, the special calibration firmware is replaced with shipping firmware that includes a shipping OS. It can be desirable to disable or remove the customized special calibration firmware as it can include security holes that are undesirable in the shipping electronic device. The functionality of the shipping OS is generally free of such security holes and complies with standardized specifications that permit interoperability between different electronic devices. For electronic devices having cellular communication functionality, such as mobile phones and two-way wireless email devices, the shipping OS is often customized for a particular network carrier. Such customizations can include, but are not limited to, graphical user interface images, the default settings for certain functionality (e.g. whether a Bluetooth radio is on or off), languages, fonts and the configuration of certain radio features.

A flash utility executing on an external computing device is typically employed to overwrite the contents of the flash memory chip via a universal serial bus ("USB") cable. This process of loading the shipping firmware onto the assembled electronic device is time-consuming, taking two to three minutes. As a result, this stage of production is costly, requiring many computers and operators to be dedicated to this task.

If the final version of the shipping firmware is completed before manufacturing begins, it can be advantageous to load the shipping firmware onto the flash memory chip in place of the factory OS prior to soldering onto the main circuit board. In this case, the shipping firmware generally must include calibration functionality in order to enable the calibration of the electronic device during manufacture. While the shipping firmware no longer needs to be placed into flash memory after assembly, the presence of such functionality in the shipping firmware can introduce security flaws in the electronic device. Further, the shipping firmware that includes the calibration functionality is less time-efficient than the special calibration firmware for calibration and customization of the electronic device.

SUMMARY OF THE INVENTION

In one aspect of the invention, there is provided an electronic device having an alterable configuration, comprising:
a processor; and
flash memory storing a boot ROM and for storing a first operating system in a first operating system partition and a second operating system in a second operating system partition, said boot ROM being executed by said processor and operable to boot said first operating system if available in said flash memory and to boot said second operating system if said first operating system is at least one of absent in said flash memory and invalid when said electronic device is powered up.

In another aspect of the invention, there is provided an electronic device having an alterable configuration, comprising:
a boot ROM for controlling the booting of said electronic device, said boot ROM being operable, when executed by a processor of said electronic device, to boot a first operating system in a first operating system partition in flash memory if present and valid and to boot a second operating system in a second operating system partition in flash memory if said first operating system is not present in said flash memory and valid when said electronic device is powered up.

In a further aspect of the invention, there is provided a method of manufacturing an electronic device, comprising:
assembling said electronic device using a flash memory, said flash memory storing a boot ROM, a first operating system in a first operating system partition and a second operating system in a second operating system partition, said boot ROM being operable to boot said first operating system if present in said flash memory and valid when said electronic device is powered up, said boot ROM being operable to boot said second operating system if said first operating system is not present in said flash memory and valid when said electronic device is powered up; and
deleting said first operating system partition in said flash memory.

In a still further aspect of the invention, there is provided a method of configuring an electronic device, comprising:
provisioning flash memory of said electronic device having a first operating system in a first operating system partition and a second operating system in a second operating system partition, said electronic device being operable to execute said second operating system if present in said flash memory and valid in lieu of said first operating system;
executing said second operating on said electronic device; and
deleting said second operating system partition in said flash memory.

In another aspect of the invention, there is provided an electronic device having an alterable configuration, comprising:
a non-volatile memory configurable to include at least a first partition and a second partition, the non-volatile memory storing a boot ROM that is operable when said boot ROM is executed by a processor of said electronic device to: in the event that a third partition is available, boot an operating system in the third partition, the operating system operable when booted to cause the third partition to be deleted and the second partition to be expanded to encompass memory freed by the deletion; and otherwise boot an operating system in the first partition.

In yet another aspect of the invention there is provided a method of manufacturing an electronic device, comprising:

assembling said electronic device using a non-volatile memory to include at least a first partition, a second partition, a third partition and a boot ROM;

causing the boot ROM to execute a first operating system stored in the first partition, in volatile memory;

deleting the first partition; and expanding the third partition to encompass non-volatile memory freed by the deleting, wherein said boot ROM is operable to execute a second operating system stored in the second partition when the first operating system is no longer available in the non-volatile memory.

According to another aspect of the invention there is provided a method of configuring an electronic device having non-volatile memory with a first partition and a second partition, comprising:

causing the electronic device to execute a downloader application, wherein the downloader application is operable when executed by a processor on the electronic device to download an installer operating system and reduce the second partition to accommodate an installer operating system partition;

storing the installer operating system in the installer operating system partition;

causing the electronic device to boot the installer operating system, wherein the installer operating system is operable when booted to overwrite an operating system in the first partition with a replacement operating system, delete the installer operating system partition, and expand the second partition to encompass non-volatile memory freed by the deletion; and causing the electronic device to boot the replacement operating system.

According to another aspect of the invention there is provided a method of configuring an electronic device, comprising:

assembling said electronic device using a non-volatile memory to include at least a first operating system in a first partition, a second operating system in a second partition, a file system in a third partition, and a boot ROM;

executing the boot ROM a first time, the boot ROM booting the first operating system into volatile memory, the first operating system deleting the first partition and expanding the third partition to encompass non-volatile memory freed by the deleting;

executing the boot ROM a second time, the boot ROM in response to determining that the first operating system is no longer available due to the deleting automatically booting the second operating system into volatile memory.

The invention allows for a second operating system to be loaded onto an electronic device and used until it is no longer required, after which it can be removed.

BRIEF DESCRIPTION OF THE DRAWINGS

Embodiments will now be described, by way of example only, with reference to the attached Figures, wherein.

DETAILED DESCRIPTION OF THE INVENTION

The invention allows both an interim and a permanent operating system to be loaded onto an electronic device prior to assembly of the device. The operating systems are loaded onto a flash chip prior to assembly of the electronic device by a specialized machine that processes multiple flash chips simultaneously. This process takes approximately thirty (30) seconds. Using this approach, the slower method of loading the shipping OS onto the electronic device using a communication interface of the assembled electronic device, such as a universal serial bus ("USB") port, can be avoided.

Figure 1:
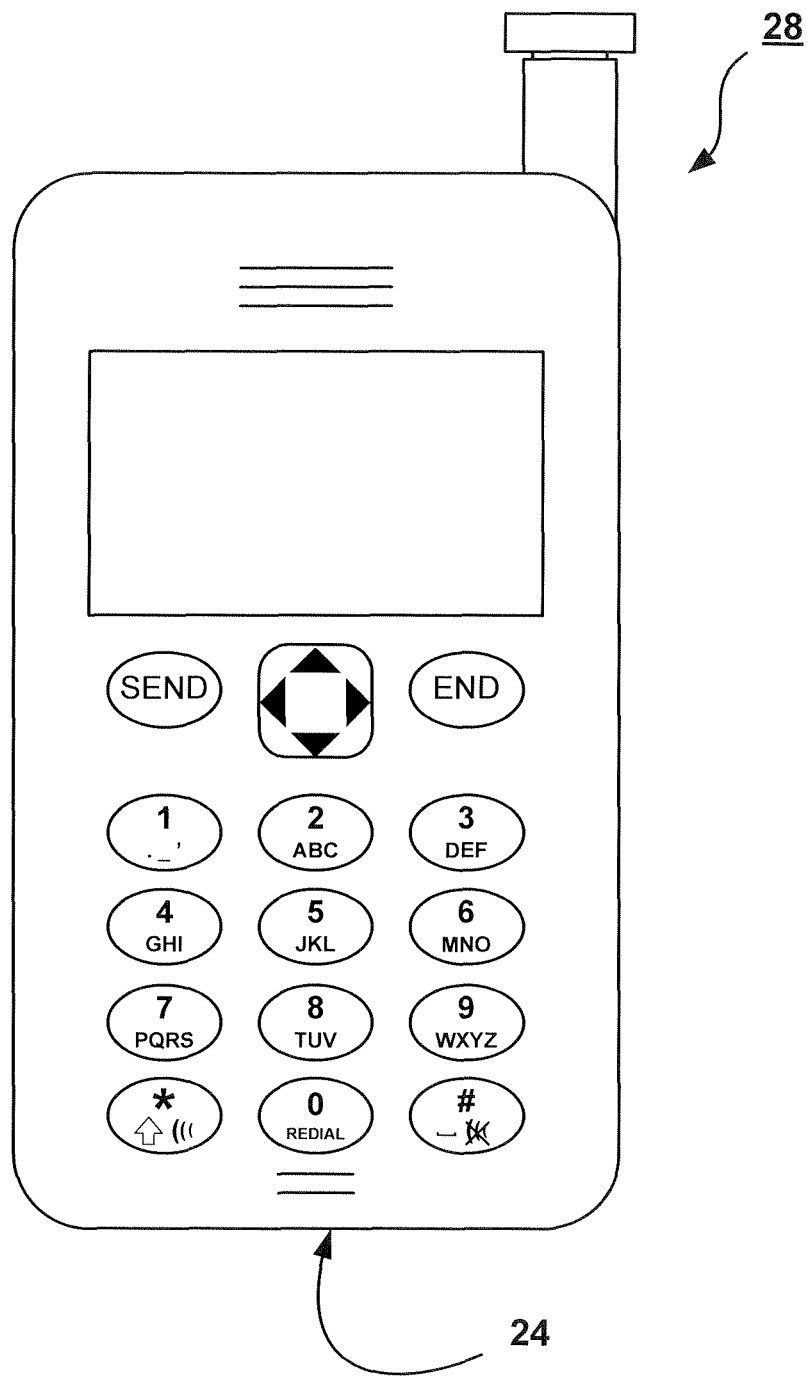
FIG. 1 shows an electronic device in accordance with an aspect of the invention.

An exemplary electronic device 20 is shown in FIG. 1. The electronic device 20 in this case is a cellular telephone capable of two-way voice and data communications. The electronic device 20 is provided with a wired communication interface 28 for wired communication with other computing devices.

Figure 2:
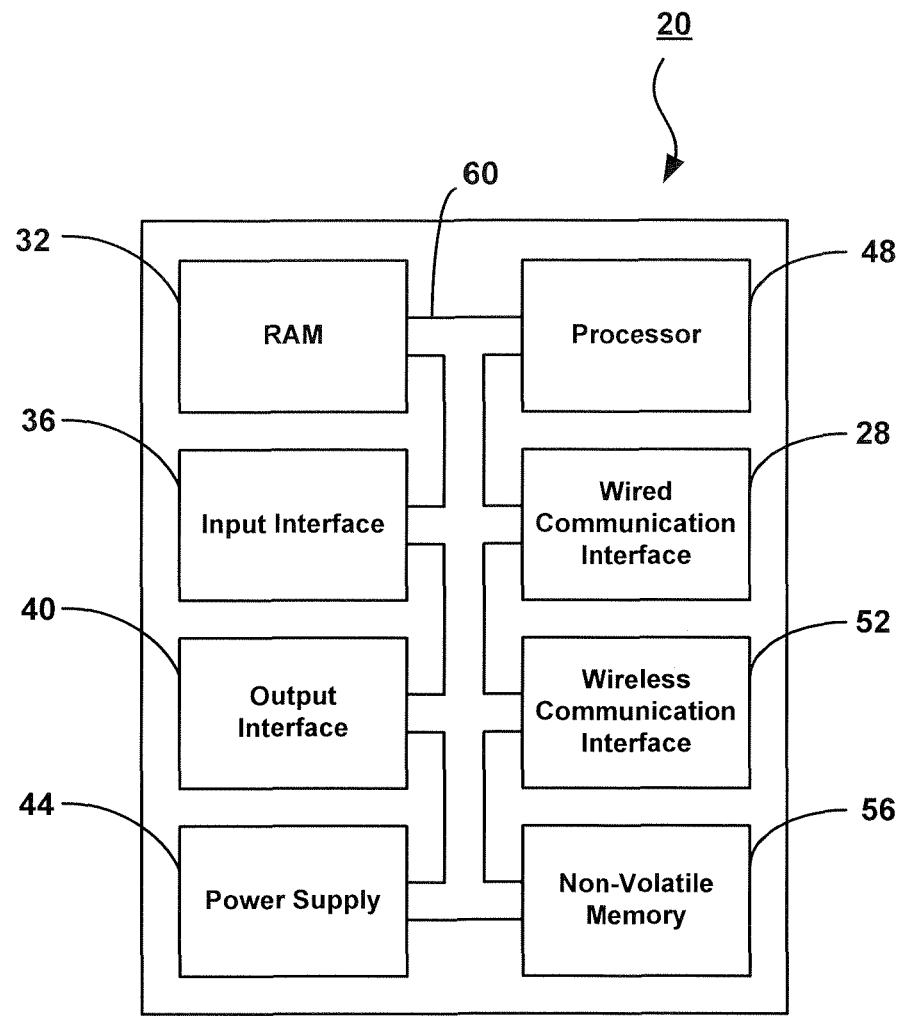
FIG. 2 is a schematic diagram of the electronic device of FIG. 1.

FIG. 2 is a schematic diagram showing the block elements of the electronic device 20, including random access memory ("RAM") 32, an input interface 36, an output interface 40, a power supply 44, a processor 48, the wired communication interface 28, a wireless communication interface 52 and non-volatile memory 56, all in communication over a local bus 60. The RAM 32 is volatile memory that is used to store data temporarily during operation of the electronic device 20. The input interface 36 includes a set of keys and controls for composing email messages, adjusting the volume or powering up the electronic device 20, and also includes a microphone for receiving audio commands and communication. The output interface 40 provides, among other things, a visual indication of communications to and from the electronic device 20. The power supply 44 is a rechargeable battery. The processor 48 executes an operating system and other software for operating the electronic device 20. The wired communication interface 28 is a universal serial bus ("USB") port that permits communication with other computing devices via a USB cable and also receives power for charging the rechargeable battery. The wireless communication interface 52 is a cellular communication radio for sending and receiving communications wirelessly.

Figure 3:
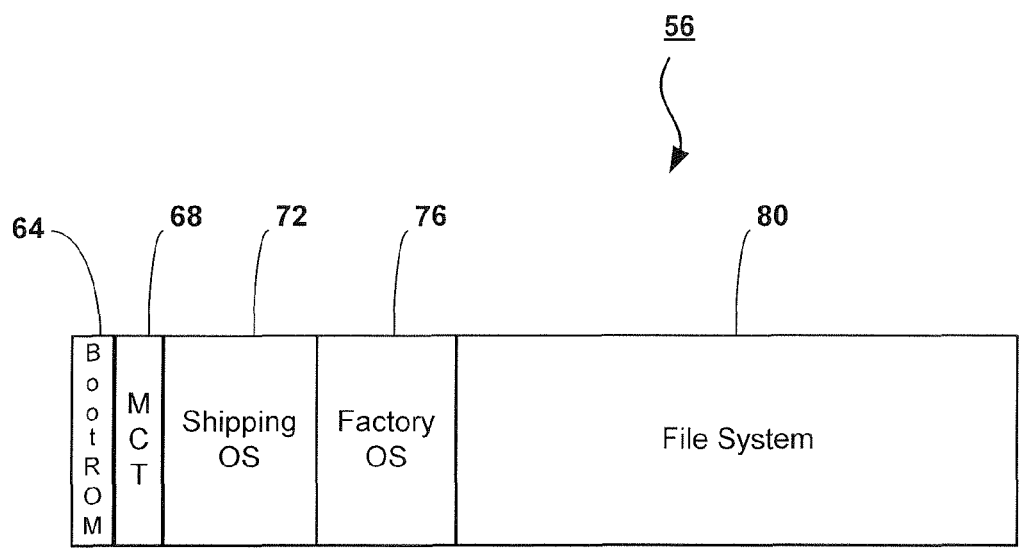
FIG. 3 is a schematic diagram of the contents of the non-volatile memory of the electronic device of FIG. 1.
Figure 7:
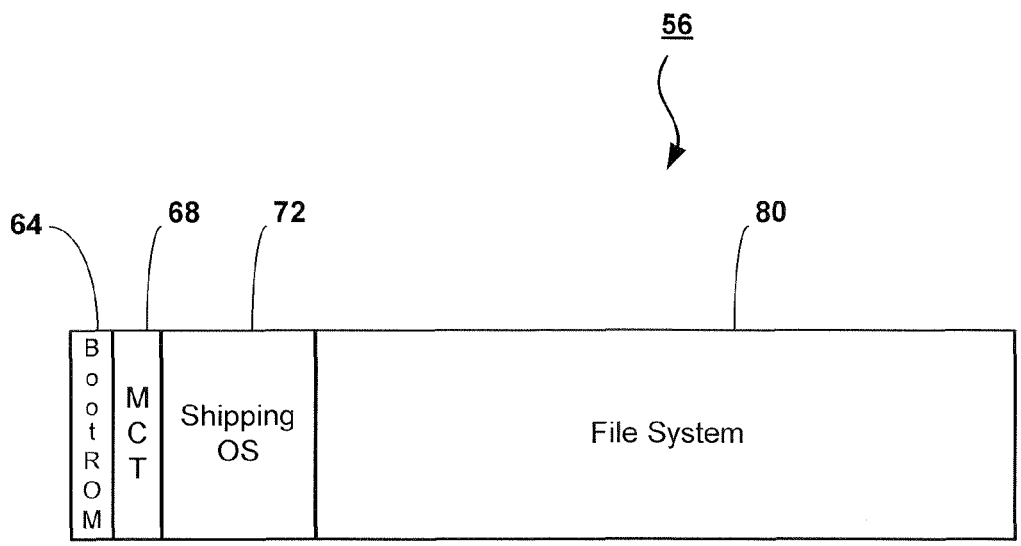
FIG. 7 is a schematic diagram of the contents of the non-volatile memory of the electronic device of FIG. 1 after performance of the method of FIG. 6.

The non-volatile memory 56 is a flash chip that is pre-loaded with a boot ROM, one or more operating systems and other programs to enable various functionality of the device. FIG. 3 better illustrates the layout of the non-volatile memory 56. The non-volatile memory 56 includes a boot ROM 64, a memory configuration table ("MCT") 68, a shipping OS partition 72, a factory OS partition 76 and a file system partition 80. The boot ROM 64 selects an OS (partition) to be booted on powering up the electronic device 20. For purposes of this discussion, "powering up" also includes the restarting or resetting of the electronic device 20. The boot ROM 64 is always located at the start of the memory address space in the non-volatile memory 56. The MCT 68 is a register of the partitions in the non-volatile memory 56. The shipping OS partition 72 houses the shipping OS that controls the operation of the electronic device 20 in a commercial environment. The factory OS partition 76 houses the factory OS that controls the operation of the electronic device 20 during calibration, etc. The file system partition 76 can include customizations for resellers or end-users, such as languages, fonts, customized logos, ringtones, profiles, etc.

Figure 4:
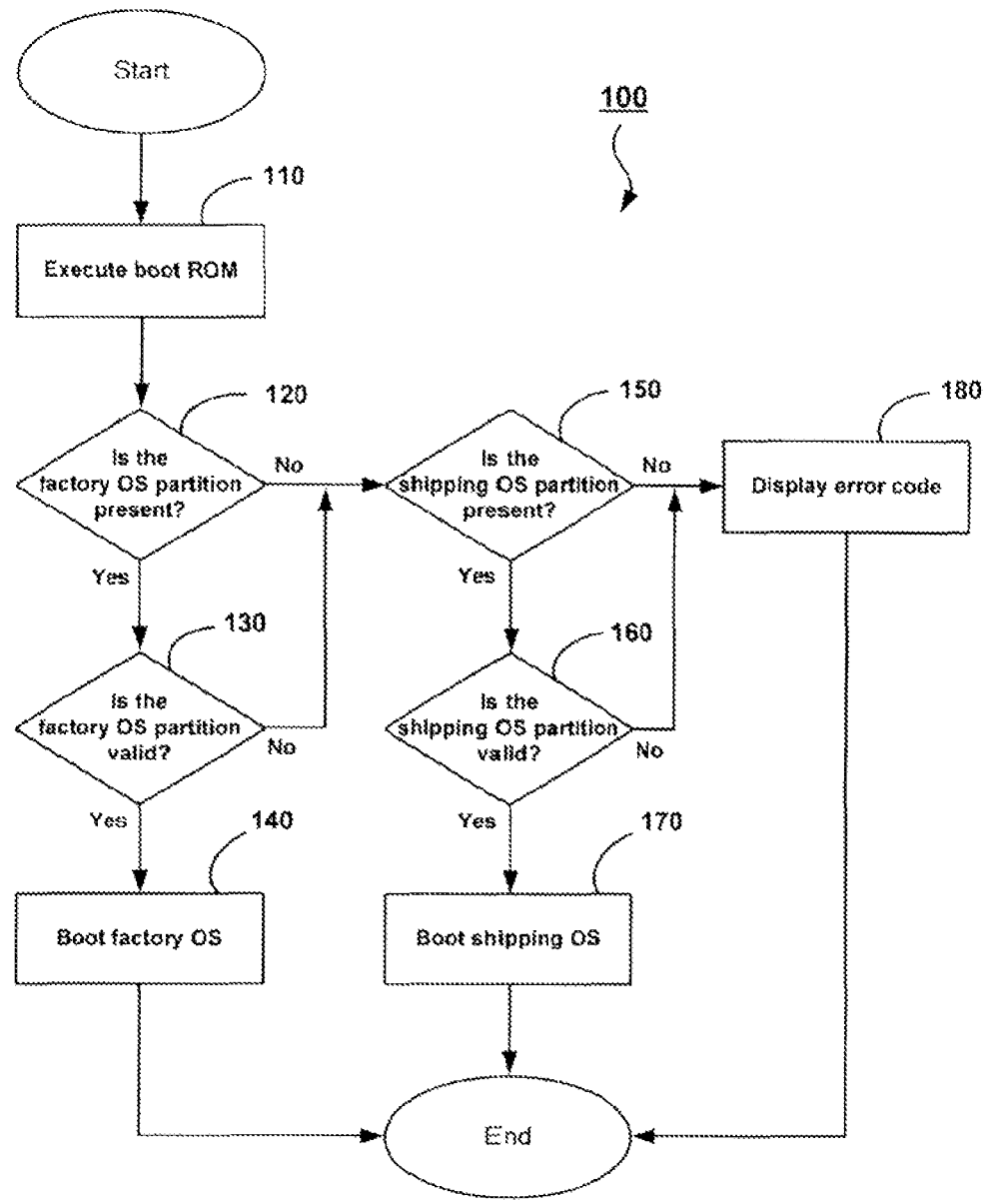
FIG. 4 illustrates the method of selecting and booting an operating system on the electronic device of FIG. 1.

FIG. 4 illustrates the method of selecting and booting an operating system, performed by the electronic device 20 generally at 100. Upon powering up, the electronic device 20 executes the boot ROM 64 (step 110). The boot ROM 64 then determines whether the factory OS partition 76 is present (step 120). If the factory OS partition 76 is present, the boot ROM 64 tries to validate the factory OS partition 76 (step 130). If the factory OS partition 76 is validated by the boot ROM 64, the factory OS is booted (step 140). If, instead, the factory OS partition 76 is not validated, or if the factory OS partition 76 is not present, the boot ROM 64 determines whether the shipping OS partition 72 is present (step 150). If the shipping OS partition 72 is present, the boot ROM 64 tries to validate the shipping OS partition 72 (step 160). If the shipping OS partition 72 is authenticated by the boot ROM 64, the shipping OS is booted (step 170). If, instead, the shipping OS partition 72 is not validated, or if the shipping OS partition 72 is not present, the boot ROM 64 displays an error code on the display of the electronic device 20 (step 180). Upon booting either of the factory OS or the shipping OS, or displaying the error code, the method 100 ends.

In order to determine whether the factory OS partition 76 and the shipping OS partition 72 are present at steps 120 and 150 respectively, the boot ROM 64 examines the MCT 68. When partition addition, deletion and modifications are made, the changes are written to the MCT 68.

During the validation of either of the factory OS partition 76 at step 130 and the shipping OS partition 72 at step 160, the boot ROM 64 attempts to locate and authenticate a digital signature in the OS partition. The digital signature includes information pertaining to the contents of the partition that is encrypted using a secret key of a trusted source. A public key corresponding to the secret key is used by the boot ROM 64 to decrypt the information, which is then used to verify that the contents have not been tampered with or otherwise damaged. The authentication is performed in order to reduce the probability that potentially malicious or damaged code is run on the electronic device 20. If the OS partition does not contain a digital signature, the validation fails. If a digital signature is present, the boot ROM 64 determines whether the digital signature corresponds to the public key. If the digital signature does not correspond to the public key, the authentication and, thus, the validation fail. If the digital signature corresponds to the public key, its information is compared to the contents of the OS partition. If the contents of the OS partition do not match the digital signature, the validation fails, otherwise the OS partition is validated.

If neither of the OS partitions are present and validated, the boot ROM 64 refuses to load an OS and displays an error code at step 180.

Figure 5:
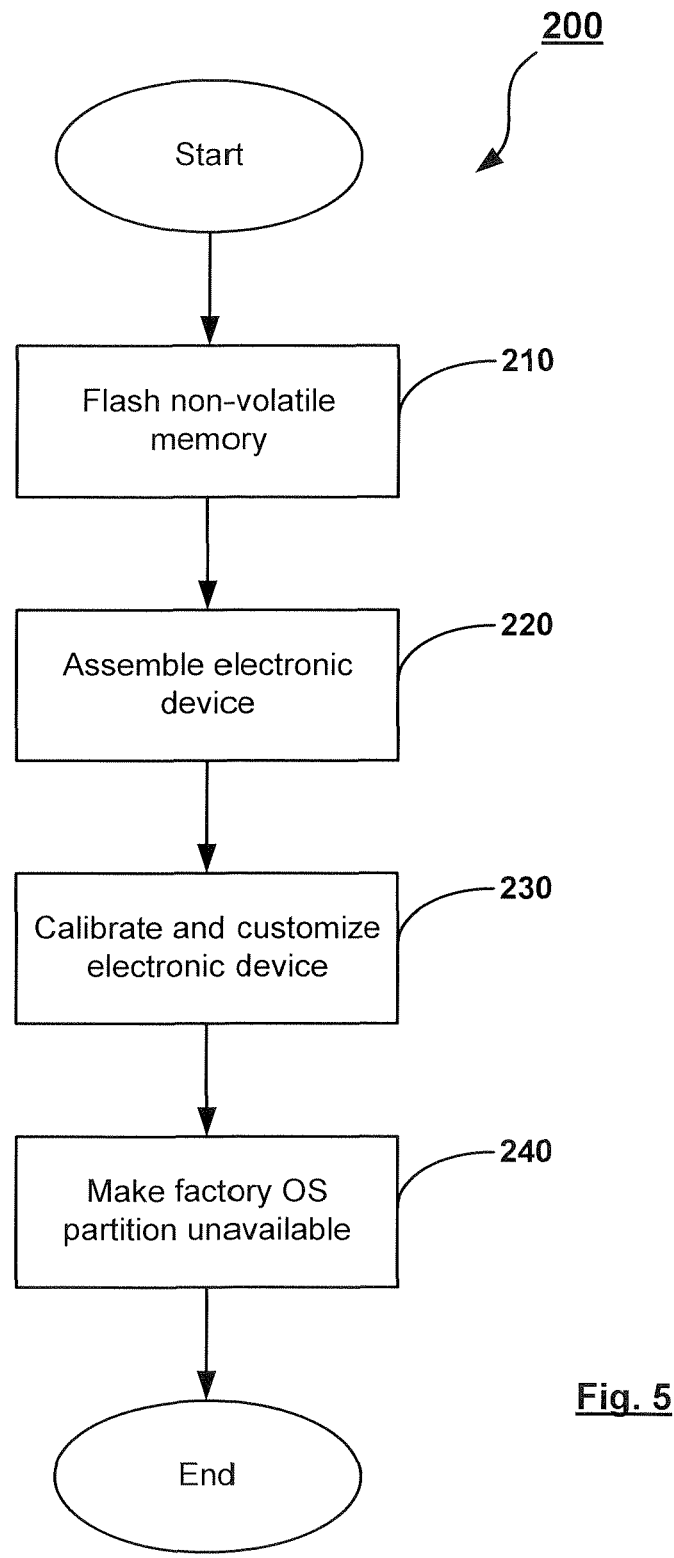
FIG. 5 illustrates the method of manufacturing the electronic device of FIG. 1.

FIG. 5 shows the method 200 of manufacturing the electronic device 20. The non-volatile memory 56 is flashed with an image to provide it with the partitions shown in FIG. 3 (step 210). The non-volatile memory 56 is then secured by soldering to a main board during assembly of the electronic device 20 (step 220). Once the electronic device 20 is assembled, it is calibrated and customized (step 230). The factory OS partition 76 is then deleted (step 240).

During the flashing or loading of the non-volatile memory 56, a master image of the contents of the non-volatile memory 56 shown in FIG. 3 is flashed to the non-volatile memory. A specialized machine processes a number of non-volatile memory chips simultaneously. The specialized machine is able to load the operating systems into the non-volatile memory 56 more rapidly than otherwise possible after assembly. This is due to the relatively slow speed of the wired communication interface 28 (i.e., USB) and the non-volatile memory of the electronic device 20. By directly loading the operating systems onto the non-volatile memory 56, the loading speed is generally only limited by the write speed of the non-volatile memory chip. When the non-volatile memory 56 is programmed directly, a voltage that is higher than otherwise possible can be used. The higher voltage enables programming of the non-volatile memory 56 at approximately twice the speed achieved when the electronic device 20 is assembled.

The factory OS includes a number of modifications that are made to reduce the time required to calibrate and customize the electronic device at step 230. For example, the shipping OS operates the USB wired communication interface 28 at an initial power level of 100 milliamps for a period of time before ramping up to an ultimate power level of 500 milliamps. This is done for compatibility reasons as some computers are equipped to handle only one of the power levels. The factory OS bypasses the initial power level and immediately employs the ultimate power level of 500 milliamps as the computers used during production use this power level for USB connections. In addition, the radios of the wireless communication interface 52 are not operated in accordance with various communication specifications in order to reduce time latencies.

During calibration, gain of the antennas of the wireless communication interface 52 is set, personal identification numbers are assigned, internal voltage references are programmed, audio volumes are calibrated, the display contrast is configured to a suitable default level, etc.

Using the method 100, the factory OS, if present and valid, will have priority over the shipping OS. In order to configure the electronic device 20 to use the shipping OS, the factory OS makes itself unavailable by deleting itself. After the deletion of the factory OS partition 76, the shipping OS will boot when the electronic device 20 is powered up.

Figure 6:
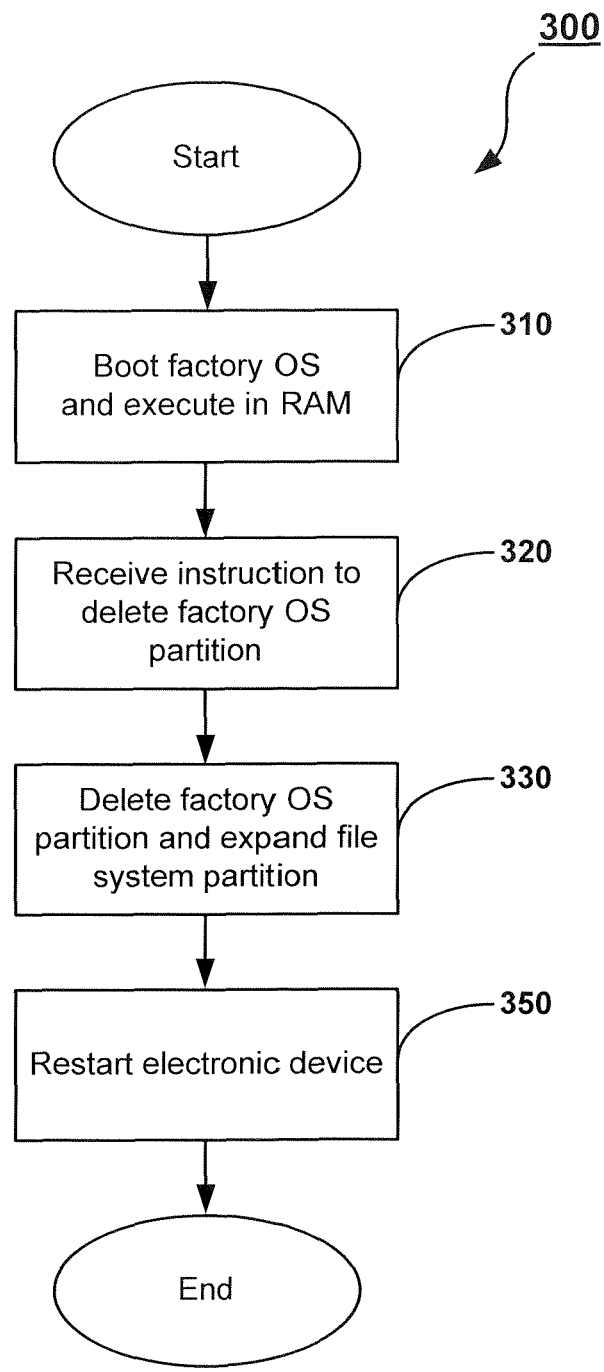
FIG. 6 illustrates the method of making an operating system unavailable during the method of FIG. 5.

FIG. 6 illustrates the method 300 of altering the configuration of the electronic device 20. The factory OS is booted and executed in RAM 32 (step 310). An instruction to delete the factory OS partition 76 is received (step 320). The factory OS partition 76 is deleted and the file system partition 80 is expanded to encompass the memory freed by the deletion of the factory OS partition 76 (step 330). The electronic device 20 is then restarted to verify the correct booting of the shipping OS (step 340).

After being loaded into RAM 32 at step 310, the factory OS provides an interface for receiving an instruction to delete the factory OS partition 76. The instruction is received via the wired communication interface 28.

As the factory OS is executed in RAM 32 when booted, it does not rely on the factory OS partition 76 in non-volatile memory 56 for operation. As a result, the factory OS is able to entirely delete the factory OS partition 76 at step 330 upon receipt of an instruction to do so. In order to delete the factory OS partition 76, the factory OS makes an API call to modify the MCT 68 to remove reference to the factory OS partition 76 and to expand the file system partition 80 to encompass the space previously occupied by the factory OS partition 76.

Upon restarting of the electronic device 20 at step 340, the shipping OS is booted by the boot ROM as a result of method 100. The electronic device 20 operates thereafter as if the factory OS was never present.

Alternative Embodiment

The invention also provides advantages in performing OS upgrades, such as over-the air ("OTA"). Some systems for updating the OS of an electronic device provide an installer application in the boot ROM that can install a new OS over the OS currently installed on the device. The boot ROM is conditioned into an install mode where it downloads the new OS or retrieves the new OS from a saved location in the file system, and then replaces the current OS with the new OS. The electronic device can thereafter use the new OS. The space available for the boot ROM, however, can be limited. Further, it can be desirable to upgrade the actual installer program itself. In addition, by placing the installer in the boot ROM, space for display drivers is generally unavailable and, thus, information cannot be displayed to a user of the electronic device during the OS upgrade. Using the invention, such OS upgrades can be performed on the electronic device without placing the installer program in the boot ROM 64. Further, the installer can be provisioned with a display driver to present information to the user of the electronic device during the OS upgrade. In addition, the installer can be equipped to handle packages compressed using differing methods.

Figure 8:
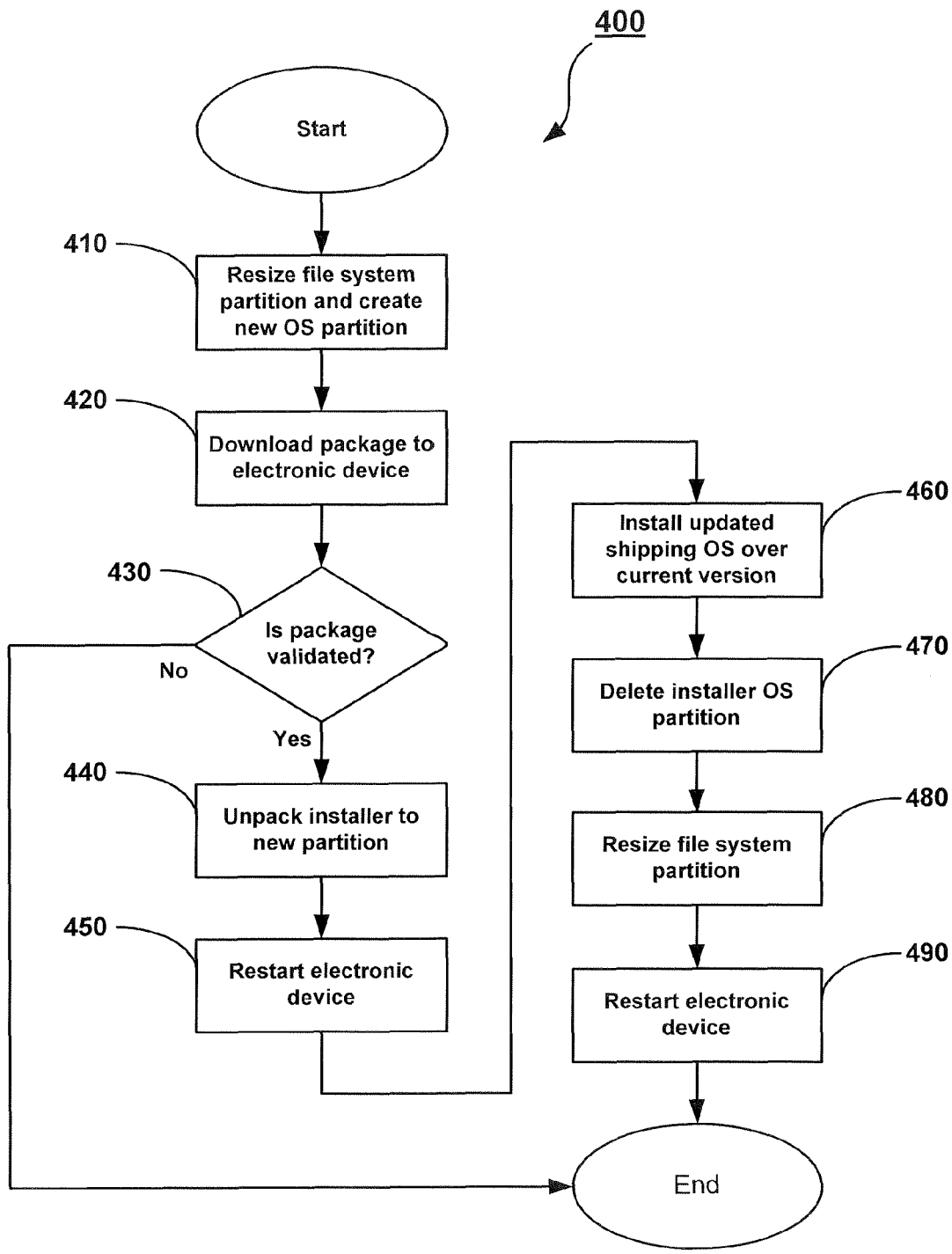
FIG. 8 illustrates a method of upgrading the operating system on an electronic device, such as the device of FIG. 1, in accordance with another embodiment of the invention.

A method of upgrading the OS of an electronic device in accordance with another embodiment of the invention is generally shown at 400 in FIG. 8. The file system partition is resized by a downloader application to accommodate a new partition (step 410). A package containing an installer OS is downloaded to the electronic device by the downloader application (step 420). The downloader application validates the package (step 430). If the package is not valid, the method 400 ends. If the package is, instead, valid, the installer OS is then unpacked by the downloader application into the new partition (step 440). The electronic device is then restarted (step 450). Upon restart, the boot ROM recognizes the presence of the second OS (i.e., the installer OS) and boots the installer OS. An installer application in the installer OS unpacks a compressed version of the upgraded shipping OS contained in the installer OS partition and writes it over the current shipping OS (step 460). The installer application, which is executing in RAM, then deletes the installer OS partition (step 470). Once the installer partition has been deleted, the installer application executing in RAM resizes the file system (step 480). The installer application then restarts the electronic device (step 490), after which the method 400 ends. Upon restart, the boot ROM does not find the second OS partition and loads the upgraded shipping OS.

During the resizing of the file system to create a new partition at step 410, a backup copy of the MCT is created to aid in failure recovery. The location of the backup of the MCT is fixed so that the boot ROM is later able to locate it. If the MCT is not modified successfully, the backup copy of the MCT is retrieved by the MCT during failure recovery. During the deletion of the installer OS partition and subsequent resizing of the file system partition, the MCT is modified before the partition resizing/deleting operations are performed to reduce the probability of failure.

In a particular embodiment, the installer OS is downloaded over-the-air.

The method 400 can also provide advantages over the method of overwriting the factory OS with the shipping OS via a USB cable. In some cases, it can be faster to download a compressed package containing the shipping OS and have an installer OS decompress and write it over the factory OS than to simply overwrite the factory OS with the shipping OS via the USB cable.

While the making of an operating system unavailable has been described as being performed by deletion, other methods will occur to those skilled in the art. For example, where an OS partition is digitally signed, one or more bits of data can be altered in the OS partition to cause it to become invalidatable.

While the invention has been described with specificity to factory and shipping OSes, other types of OSes will occur to those skilled in the art.

Some or all of an operating system can be upgraded using the invention. The invention enables a partial or complete upgrade of an operating system of an electronic device. As the operating system being modified or replaced is not executing or otherwise being used, the installer can make differing levels of modifications to it.

The above-described embodiments of the invention are intended to be examples of the invention and alterations and modifications may be effected thereto, by those of skill in the art, without departing from the scope of the invention which is defined solely by the claims appended hereto.

What is claimed is:

1. An electronic device, comprising:
non-volatile memory including a first operating system in a first partition, a second operating system in a second partition, and a third partition;
the non-volatile memory storing a boot ROM that is operable when the boot ROM is executed by a processor of the electronic device to:
boot the second operating system when the first operating system is not available or is invalid;
otherwise, boot the first operating system, the first operating system operable when booted to delete or invalidate or make unavailable the first operating system and cause the third partition to expand to encompass memory freed by the deleting or the making invalid or the making unavailable the first operating system.

2. The electronic device of claim 1, wherein the boot ROM is further operable, when the boot ROM is executed by the processor of the electronic device, to verify the second operating system is valid prior to booting the second operating system.

3. The electronic device of claim 1, wherein the first operating system is further operable, when booted, to calibrate the electronic device prior to deleting or invalidating or making unavailable the first operating system.

4. The electronic device of claim 1, wherein the first operating system, when booted, is operable to delete the first operating system and expand the third partition to encompass the memory freed by the deletion.

5. The electronic device of claim 1, wherein the electronic device is a mobile device.

6. The electronic device of claim 1, wherein the boot ROM is executed by the processor when the electronic device is powered up.

7. The electronic device of claim 1, wherein the first operating system is a factory operating system and the second operating system is a shipping operating system.

8. The electronic device of claim 1, wherein the non-volatile memory further includes a memory configuration table comprising a register of partitions that is updated when partition addition, deletion, and modifications are made.

9. The electronic device of claim 1, wherein the first operating system is an installer operating system.

10. The electronic device of claim 9, wherein the electronic device is configured to download the installer operating system over-the-air.

11. A method comprising:
storing in non-volatile memory a first operating system in a first partition, a second operating system in a second partition, and a boot ROM;
the non-volatile memory including a third partition;
the boot ROM being operable when the boot ROM is executed by a processor of an electronic device to:
boot the second operating system when the first operating system is not available or is invalid;
otherwise, boot the first operating system, the first operating system operable when booted to delete or invalidate or make unavailable the first operating system and cause the third partition to expand to encompass memory freed by the deleting or the making invalid or the making unavailable the first operating system.

12. The method of claim 11 further comprising: executing the boot ROM a first time, the boot ROM booting the first operating system, and the first operating system deleting the first partition to delete the first operating system.

13. The method of claim 12 further comprising: subsequent to said executing the boot ROM a first time, executing the boot ROM a second time, the boot ROM booting the second operating system.

14. The method of claim 11 wherein the boot ROM is further operable, when the boot ROM is executed by the processor of the electronic device, to verify the second operating system is valid prior to booting the second operating system.

15. The method of claim 11, wherein the first operating system is further operable, when booted, to calibrate the electronic device prior to deleting or invalidating or making unavailable the first operating system.

16. The method of claim 11, wherein the first operating system, when booted, is operable to delete the first operating system and expand the third partition to encompass the memory freed by the deletion.

17. The method of claim 11, wherein the electronic device is a mobile device.

18. The method of claim 11, wherein the first operating system is a factory operating system and the second operating system is a shipping operating system.

19. The method of claim 11, further comprising storing in the non-volatile memory a memory configuration table comprising a register of partitions that is updated when partition addition, deletion, and modifications are made.

20. The method of claim 11, wherein the non-volatile memory is flash memory.

\* \* \* \* \*